(12) United States Patent
Senior

(10) Patent No.: US 8,107,676 B2
(45) Date of Patent: Jan. 31, 2012

(54) LINE LENGTH ESTIMATION

(75) Inventor: Andrew W. Senior, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 12/028,100

(22) Filed: Feb. 8, 2008

(65) Prior Publication Data

US 2009/0034797 A1 Feb. 5, 2009

Related U.S. Application Data

(60) Provisional application No. 60/952,622, filed on Jul. 30, 2007.

(51) Int. Cl.
*G06K 9/00* (2006.01)
(52) U.S. Cl. .......................................... 382/103
(58) Field of Classification Search .................. 382/100, 382/103, 104; 348/143, 148, 149, 150
See application file for complete search history.

(56) References Cited

U.S. PATENT DOCUMENTS

| 5,581,625 A * | 12/1996 | Connell | 382/1 |
| 2003/0190058 A1 | 10/2003 | Jun et al. | 382/104 |
| 2007/0253595 A1* | 11/2007 | Sorensen | 382/103 |

OTHER PUBLICATIONS

Haritaoglu et al., "Detection and Tracking of Shopping Groups in Stores," IEEE Computer Society Conference on Computer Vision and Pattern Recognition, vol. 1, Abstract only, 2001, 1 page.
Roqueiro et al., "Counting People using Video Cameras," ACM, Aug. 20, 2006, 10 pages.
Zhao et al., "Tracking Multiple Humans in Crowded Environment," IEEE Computer Society Conference on Computer Vision and Pattern Recognition, 2004, 8 pages.
Leykin et al., "Detecting Shopper Groups in Video Sequences," IEEE International Conference on Advanced Video and Signal based Surveillance, Sep. 2007, 6 pages.
Andrew Senior, "Real-time Articulated Human Body Tracking Using Silhouette Information,"IEEE Workshop on Performance Evaluation of Tracking and Surveillance, Oct. 2003, 8 pages.
Higashikubo et al., "Traffic Queue Length Measurement Using an Image Processing Sensor," Third Annual World Congress on Intelligent Transport Systems, Oct. 14-18, 1996, 6 pages.

* cited by examiner

*Primary Examiner* — Andrew W Johns
(74) *Attorney, Agent, or Firm* — Anne L. Linne; Hoffman Warnick LLC

(57) ABSTRACT

A solution for monitoring an area is provided. At least one image of a physical area corresponding to a line is obtained and a set of hypotheses are evaluated based on the image(s). For one or more hypotheses, an estimated length of the line is extracted, and an estimated line length is generated based on the estimated length(s) and the corresponding evaluation(s) of the set of hypotheses. In this manner, a length of a line of people, customers, vehicles, and/or the like, can be estimated. The estimation can be stored for later use, utilized to generate one or more alerts, and/or the like. The invention also provides for the use of a single camera to monitor multiple lines and/or perform other monitoring functions.

25 Claims, 8 Drawing Sheets

LINE LENGTH ESTIMATION

REFERENCE TO PRIOR APPLICATION

The current application claims the benefit of U.S. Provisional Application No. 60/952,622, titled "Line Length Estimation", which was filed on 30 Jul. 2007, and which is hereby incorporated by reference.

TECHNICAL FIELD OF THE INVENTION

Aspects of the invention relate generally to image-based monitoring, and more particularly, to estimating a number of people and/or vehicles waiting in a line (queue).

BACKGROUND OF THE INVENTION

In a public establishment, such as a store, bank, government office, amusement park, and the like, waiting in a line to perform a transaction is a common source of frustration of individuals. Often, long waits in lines and/or long lines directly lead to low satisfaction on the part of the individuals visiting the establishment. As a result, establishments have implemented various approaches for reducing the length of lines and/or amount of time that individuals spend in line. Some of these approaches propose the use of video cameras to count individuals in line. To date, these camera-based approaches require cameras having a particular orientation with respect to the line (e.g., side-on camera view, top-down camera view, and/or the like). For example, one approach uses a mean shift tracker to track customers waiting in line. In other video applications, a technique of Markov Chain Monte Carlo has been used to count the number of people in a crowd of moving people.

SUMMARY OF THE INVENTION

Aspects of the invention provide a solution for monitoring an area. At least one image of a physical area corresponding to a line is obtained and a set of hypotheses are evaluated based on the image(s). For one or more hypotheses, an estimated length of the line is extracted, and an estimated line length is generated based on the estimated length(s) and the corresponding evaluation(s) of the set of hypotheses. In this manner, a length of a line of people, customers, vehicles, and/or the like, can be estimated. The estimation can be stored for later use, utilized to generate one or more alerts, and/or the like. The invention also provides for the use of a single camera to monitor multiple lines and/or perform other monitoring functions.

A first aspect of the invention provides a method of monitoring an area, the method comprising: obtaining at least one image of a physical area corresponding to a line; evaluating a set of hypotheses based on the at least one image; extracting an estimated length from at least one of the set of hypotheses; generating an estimated line length based on the extracted estimated lengths and the evaluating; and storing the estimated line length.

A second aspect of the invention provides a system for monitoring an area, the system comprising: a module for obtaining at least one image of a physical area corresponding to a line; a module for evaluating a set of hypotheses based on the at least one image; a module for extracting an estimated length from at least one of the set of hypotheses; a module for generating an estimated line length based on the extracted estimated lengths and the evaluating; and a module for storing the estimated line length.

A third aspect of the invention provides a computer program comprising program code stored on a computer-readable medium, which when executed, enables a computer system to implement a method for monitoring an area, the method including: obtaining at least one image of a physical area corresponding to a line; evaluating a set of hypotheses based on the at least one image; extracting an estimated length from at least one of the set of hypotheses; generating an estimated line length based on the extracted estimated lengths and the evaluating; and storing the estimated line length.

A fourth aspect of the invention provides a method of generating a system for monitoring an area, the method comprising: providing a computer system operable to: obtain at least one image of a physical area corresponding to a line; evaluate a set of hypotheses based on the at least one image; extract an estimated length from at least one of the set of hypotheses; generate an estimated line length based on the extracted estimated lengths and the evaluating; and store the estimated line length.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the invention will be more readily understood from the following detailed description of the various aspects of the invention taken in conjunction with the accompanying drawings that depict various aspects of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for monitoring an area. At least one image of a physical area corresponding to a line is obtained and a set of hypotheses are evaluated based on the image(s). For one or more hypotheses, an estimated length of the line is extracted, and an estimated line length is generated based on the estimated length(s) and the corresponding evaluation(s) of the set of hypotheses. In this manner, a length of a line of people, customers, vehicles, and/or the like, can be estimated. The estimation can be stored for later use, utilized to generate one or more alerts, and/or the like. The invention also provides for the use of a single camera to monitor multiple lines and/or perform other monitoring functions. As used herein, unless otherwise noted, the term "set" means one or more (i.e., at least one) and the phrase "any solution" means any now known or later developed solution.

Figure 1:
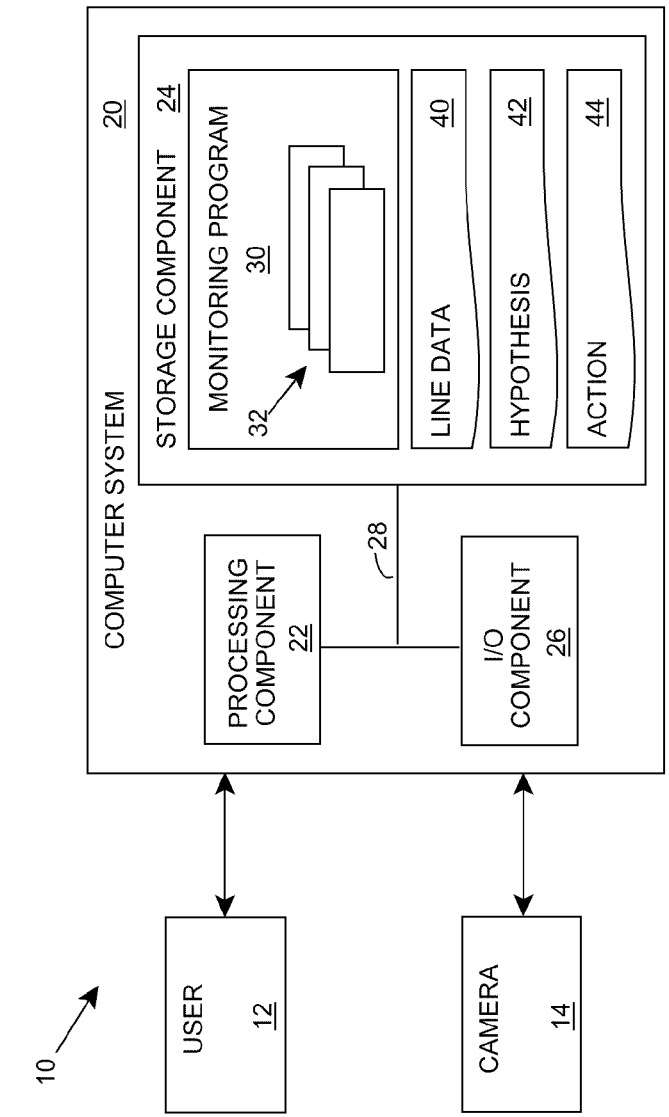
FIG. 1 shows an illustrative environment for estimating a line length according to an embodiment.

Turning to the drawings, FIG. 1 shows an illustrative environment 10 for estimating a line length according to an embodiment. To this extent, environment 10 includes a computer system 20 that can perform the process described herein in order to estimate the length of one or more lines of customers, people, and/or the like. In particular, computer system 20 is shown including a monitoring program 30, which makes computer system 20 operable to estimate the length of a line by performing the process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as monitoring program 30, which is at least partially stored in storage component 24. While executing program code, processing component 22 can read and/or write data to/from storage component 24 and/or I/O component 26. Pathway 28 provides a communications link between each of the components in computer system 20. I/O component 26 can comprise one or more human I/O devices, which enable a human user 12 to interact with computer system 20 and/or one or more communications devices to enable another computer system, such as user 12 and/or camera 14, to communicate with computer system 20 using any type of communications link.

In any event, computer system 20 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, monitoring program 30 can be embodied as any combination of system software and/or application software. Further, monitoring program 30 can be implemented using a set of modules 32. In this case, a module can comprise a component that performs a set of actions used by monitoring program 30. Further, it is understood that some of the actions discussed herein may not be implemented or additional actions may be implemented by computer system 20.

When computer system 20 comprises multiple computing devices, each computing device can have only a portion of monitoring program 30 installed thereon (e.g., one or more modules 32). However, it is understood that computer system 20 and monitoring program 30 are only representative of various possible equivalent computer systems that may implement the process described herein. To this extent, in other embodiments, the actions implemented by computer system 20 and monitoring program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing the process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, monitoring program 30 enables computer system 20 to estimate a length of a line based on image(s) captured by one or more cameras 14. The line can be formed by one or more people, one or more vehicles, and/or the like. Further, the line can include other objects, such as a grocery cart, which are related to the people/vehicles present in the line. In an embodiment, camera 14 is located such that it is above and at an angle with respect to an area where the line will form (e.g., cash register, tellers, and/or the like). Further, camera 14 can be located such that it can image faces of individuals/license plates of vehicles waiting in the line, when they are generally facing towards the front of the line. However, it is understood that camera 14 can be located anywhere with respect to the location of the line. In an embodiment, camera 14 comprises a video camera and computer system 20 continuously evaluates frames of the video captured by camera 14. Alternatively, camera 14 can comprise a still camera, which periodically captures photographs of the line.

User 12 can perform various calibrations on the images captured by camera 14. For example, user 12 can orient a set of axes to define the ground plane and vertical axis seen through the camera. Further, user 12 can adjust a three-dimensional model of a person, object (e.g., shopping cart), and/or the like to correspond to the expected/typical size and orientation of people/objects visible in the images captured by camera 14. When camera 14 images faces of people in the line, computer system 20 can detect and/or identify people in the image based on certain visual characteristics of a person imaged by camera 14. Still further, user 12 can define the area in the image where the line will form.

In an embodiment, a single camera 14 is utilized to monitor multiple, distinct lines (e.g., multiple cash registers). In this case, camera 14 can comprise a pan-tilt-zoom camera that is moved to image each line. To this extent, user 12 also can define a preferred location of the camera 14 for imaging each line. Further, camera 14 can be located such that two or more lines are simultaneously imaged. Still further, two or more cameras 14 can be used to image a single line. It is understood that various combinations of cameras 14 can be implemented in different embodiments. For example, three cameras 14 could be implemented to monitor two lines, with two cameras fixed on one of the respective lines, and a third pan-tilt-zoom camera that is moved to alternately image each line.

In general, computer system 20 constructs a hypothesis 42 of the set of people and objects visible in an image for a line, which is stored as line data 40. In an embodiment, computer system 20 manages a set of hypotheses 42 for each line. Computer system 20 can manage the set of hypotheses 42 and line data 40 and the image(s) included therein using any solution (e.g., using one or more databases). In any event, each hypothesis 42 includes zero or more proposals. A proposal comprises a projection of a model of a person, movable object, and/or the like, and the corresponding location within a given image. Additionally, the proposal can include data on the individual(s)/object(s), such as whether it is related with another proposal of an individual/object (e.g., shopper with shopping cart, parent with child, and/or the like).

The model of a person/object can comprise any complexity. For example, the model can comprise a rectangle (or other polygon), an ellipse, a multiple degrees of freedom articulated human body model, a cuboid (with 1 rotation degree of freedom) for a shopping cart, a connected head and body model of a person (e.g., when face detection is utilized), and/or the like. A height of a person also can comprise a parameter for each model. In an embodiment, a person/object is modeled as a quadrilateral.

Hypothesis 42 can be represented in three-dimensional space, in the image plane, and/or the like. Further, stationary objects (e.g., shop furniture) can be projected and represented so that partial/total occlusions of a person/object can be properly handled. To this extent, occluded person/object models can be used. For example, an object model of a register clerk that is partially occluded by the checkout lane can be used. In this case, the model will comprise a shorter height (e.g., only the upper body), and no features corresponding to the leg area is/are explained in the proposal.

In an embodiment, computer system 20 calculates frame differences between consecutive images captured by camera 14 to detect areas where people are moving. Computer system 20 uses the frame differences to propose locations of people/objects in the scene. People or object proposals are added to an overall hypothesis 42 in a Markov Chain Monte Carlo (MCMC) framework. In this case, computer system 20 maintains a pool of hypotheses 42, with each hypothesis 42 containing a set of person/object locations. When a ground plane is defined for an imaged area, all the locations can be assumed to be on the ground plane. Computer system 20 can modify hypotheses 42 from the pool by the addition or removal of a person/object proposal, the moving/modification of an existing proposal (e.g., changing a child proposal into an adult, an adult proposal into a shopping cart, etc.), and/or the like.

Computer system 20 can evaluate each hypothesis 42 by calculating a match score between the hypothesis 42 and the image features. For example, computer system 20 can project each hypothesis 42 into an image and compare the visual characteristics of the projected hypothesis 42 with the visual characteristics of the image. These visual characteristics may include, but are not limited to, foreground regions (produced by background subtraction), edges, foreground edges (produced by background subtraction in the edge domain), color regions, motion (for instance by point tracking), frame differences, and/or the like. In an embodiment, computer system can project each hypothesis 42 into multiple images of the same space (e.g., taken by two or more cameras 14). Further, computer system 20 can track each hypothesis 42 by observing it over a period of time. In this case, a particular proposal of the hypothesis 42 (e.g., a location of a person) will be strengthened when the proposal is found to be consistent with the visual evidence over a long period of time.

In any event, computer system 20 can award a high match score for a hypothesis 42 where projections of all the objects covered all the areas flagged as foreground by background subtraction, where the frame differences aligned to the edges of hypothesis 42 objects, where the shopping cart proposal's projections covered pixels whose color matched the color of the store's shopping carts, and/or the like. At any given instant, computer system 20 can use the hypothesis 42 having a maximum likelihood (e.g., highest match score) as an accurate evaluation of the image. Alternatively, computer system 20 can combine a group of the highest hypotheses 42 in evaluating the image.

In addition to one or more images, computer system 20 can obtain additional data with respect to the physical area where a line may form and utilize the additional data in generating/evaluating hypotheses 42. For example, computer system 20 can obtain line data 40 having a different modality (e.g., radio frequency identification, infrared, thermal, pressure pads, beam breakers, point of sale terminal transaction, and/or the like). The line data 40 can be used to augment observations in the image(s) and determine the likelihood of a hypothesis 42 being correct. For example, a point of sale terminal transaction could be evidence of the presence of an employee and a customer near a cash register; a pressure pad may indicate the presence of one or more individuals in the line; an RFID tag can indicate the presence of a shopping cart; infrared image data can be utilized to identify the location of a person; and/or the like. Computer system 20 can combine this line data 40 with the image(s) in evaluating a hypothesis 42 (e.g., assigning a match score).

Computer system 20 can store each hypothesis 42 and the corresponding match score for subsequent utilization. Alternatively, a subset of hypotheses 42 (e.g., highest match scores) can be stored and subsequently utilized. Regardless, computer system 20 can extract various types of information/measurements from the set of hypotheses 42, which can be stored as line data 40. As used herein in conjunction with data, the term "store" or "storing" means saving the data in any temporary or long term tangible medium of expression, including writing the data to a memory, saving the data in a storage device, and/or the like.

For example, computer system 20 can extract a length of the line using the set of hypotheses 42. In an embodiment, computer system 20 extracts the length of the line from each hypothesis 42, or a subset of the hypotheses (e.g., one or more hypotheses 42 having the highest match score), using any solution. For example, computer system 20 can count a number of people whose feet fall within a given floor area defined for the line, a number of vehicles within a road area defined for the line, and/or the like. It is understood that more complex schemes can be devised in which the proximity of people is considered (e.g., to determine if they may be part of a group), a consistency of a person's presence (e.g. to determine if the person is just passing by), and/or the like. Regardless, computer system 20 can generate an estimated length of the line by combining the extracted lengths using any solution, e.g., by integrating over all the hypotheses 42 and their corresponding likelihoods to obtain a maximum a posteriori answer, which takes into account prior probabilities.

Figure 2:
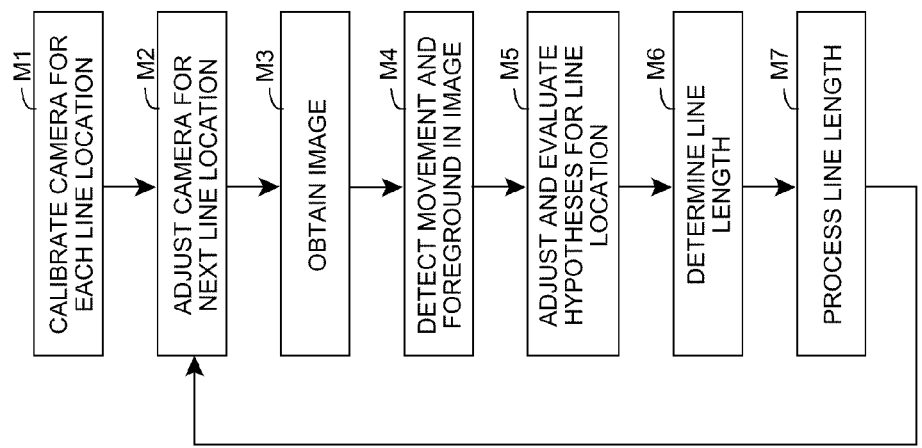
FIG. 2 shows an illustrative flow diagram for estimating line lengths for a plurality of lines using a single camera according to an embodiment.

FIG. 2 shows an illustrative flow diagram for estimating line lengths for a plurality of lines using a single camera 14 according to an embodiment, which can be implemented by computer system 20 (FIG. 1). Referring to FIGS. 1 and 2, in process M1, user 12 and/or computer system 20 can calibrate camera 14 for each line location to be imaged by camera 14. For example, user 12 can designate a position for camera 14 and/or outline a line location within a field of view of camera 14, which corresponds to the physical area where the line may form. To this extent, FIGS. 4A-D show illustrative images of a line location according to an embodiment, in which the line area is defined as a substantially rectangular area of the floor between two cash registers.

In any event, returning to FIGS. 1 and 2, in process M2, computer system 20 can adjust camera 14 to image the next line location. In particular, computer system 20 can operate the pan-tilt-zoom of camera 14 such that a field of view of camera 14 corresponds to a desired field of view for the line location. In process M3, computer system 20 obtains the image from camera 14. For example, computer system 20 can instruct camera 14 to capture the image, and camera 14 can transmit the captured image to computer system 20.

In process M4, computer system 20 can process the image to detect any movement using any solution (e.g., by a comparison with one or more previous images for the line stored in line data 40) and detect the foreground in the image using any solution (e.g., using background subtraction). For example, an embodiment uses a standard background subtraction technique and human/object models with a few degrees of freedom, which are projected into the image and used to account for the foreground regions detected by background subtraction.

Figure 3:
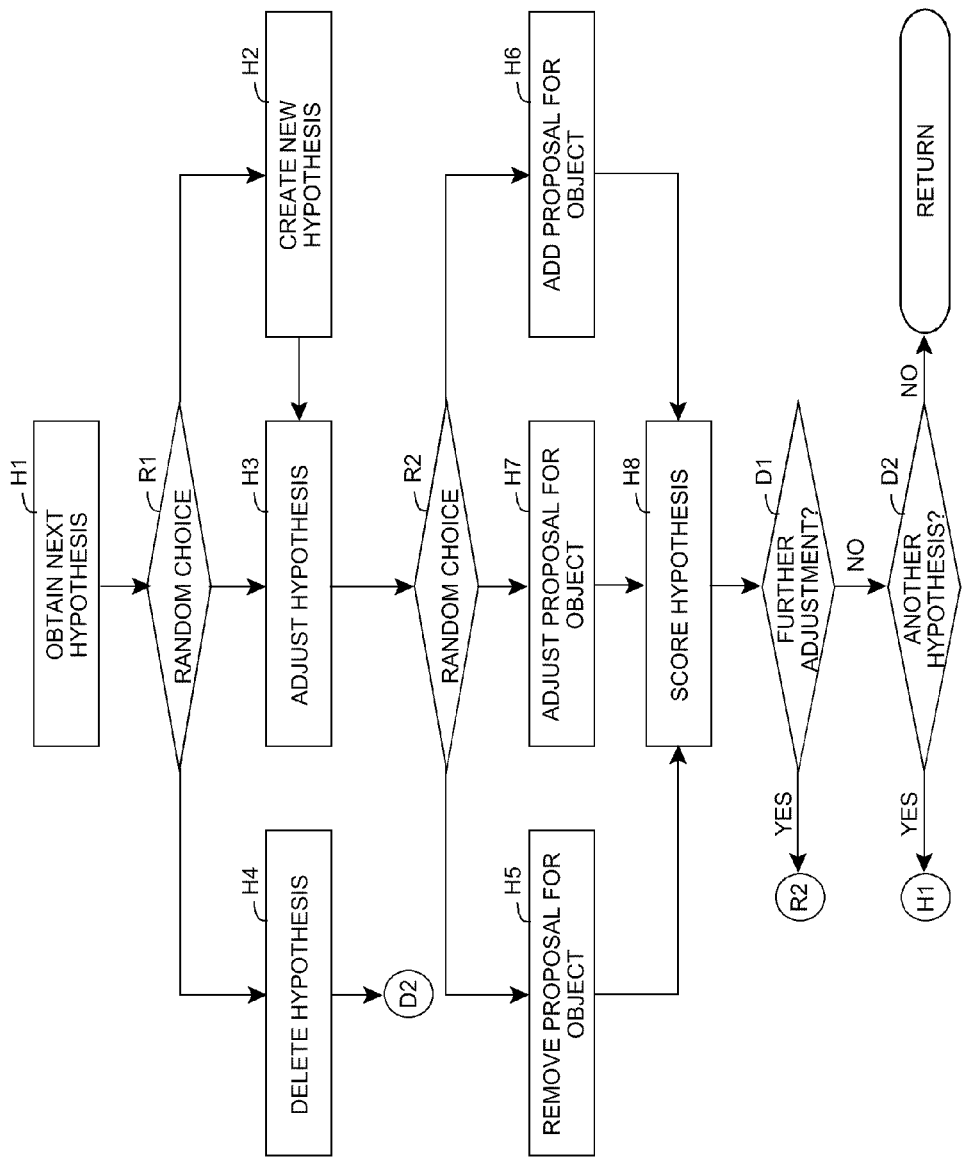
FIG. 3 shows an illustrative flow diagram for generating and evaluating a set of hypotheses for a line location according to an embodiment.

In process M5, computer system 20 can adjust and evaluate the set of hypotheses 42 for the line location based on the newly acquired image(s) using any solution. FIG. 3 shows an illustrative flow diagram for generating and evaluating a set of hypotheses 42 for a line location according to an embodiment, which can be implemented by computer system 20 (FIG. 1). In this case, the hypotheses 42 are generated and evaluated using a Markov Chain Monte Carlo method. Referring to FIGS. 1 and 3, in process H1, computer system 20 can obtain the next hypothesis 42 for evaluation. In decision R1, computer system 20 can make a random/pseudo-random choice as to how to proceed. Based on the choice, computer system 20 can create a new hypothesis 42 in process H2, adjust hypothesis 42 in process H3, or delete hypothesis 42 in process H4. If hypothesis 42 is deleted in process H4, flow can proceed directly to decision D2. In process H2, the new hypothesis 42 can be generated from scratch or by perturbing the current hypothesis 42.

In any event, flow can proceed to process H3 in which the current hypothesis 42 is adjusted directly from decision R1 and/or after a new hypothesis is created in process H2. Computer system 20 can adjust hypothesis 42 using any solution. For example, computer system 20 can add, modify, delete, and/or the like, one or more proposals in hypothesis 42. To this extent, in decision R2, computer system 20 can make a random/pseudo-random choice as to how to proceed. Based on the choice, computer system 20 can remove a proposal for an object in process H5, add a proposal for an object in process H6, or adjust a proposal for an object in process H7. The proposal removed/adjusted can be randomly selected. Further, the adjustment and/or location of a new proposal can be randomly selected. Alternatively, computer system 20 can select the proposal for removal/adjustment, the location of a new proposal, and/or the adjustment to an existing proposal based on a previous evaluation of hypothesis 42 using any solution (e.g., select lowest scoring proposal for deletion/modification). Still further, computer system 20 can perform any number of adjustments to hypothesis 42. To this extent, computer system 20 can repeat decision R2 and the corresponding selected process H5-7 any number of times, which can be a number chosen in advance, determined based on a termination criterion (e.g., is the new solution good enough, have we run out of time before the next frame, and/or the like), randomly selected, and/or the like.

The choices in decisions R1, R2 and/or processes H5-7 discussed herein can be selected randomly using any solution. In an embodiment, computer system 20 implements a weighted distribution that can be determined based on a previous evaluation of the hypothesis 42. For example, a poor hypothesis can be more likely to be deleted, while a good hypothesis 42 may be more likely to have another hypothesis generated by perturbing the hypothesis 42. Similarly, a proposal that has a low match score can be more likely to be deleted/adjusted than a proposal having a high match score.

In any event, in process H8, computer system 20 can score the hypothesis 42 using any solution. For example, computer system 20 can project the hypothesis 42 into the image and compare the visual characteristics of the projected hypothesis 42 with the visual characteristics of the image. Additionally, computer system 20 can use data other than the image to supplement the projection. In any event, the score can be stored with hypothesis 42, and in decision D1, computer system 20 can determine whether any further adjustment(s) should be made to hypothesis 42 using any solution (e.g., preset number). If so, flow can return to decision R2. Otherwise, flow can proceed to decision D2, in which computer system 20 can determine whether another hypothesis requires processing. If so, flow returns to process H1, otherwise the flow can terminate.

Figure 4A:
FIGS. 4A-D show illustrative images of a line location according to an embodiment.
Figure 4B:
Figure 4C:
Figure 4D:

Returning to FIGS. 1 and 2, after all the hypotheses 42 have been evaluated and/or modified in process M5, computer system 20 can determine a length of the line in process M6 using any solution. For example, as shown in FIG. 4A, computer system 20 (FIG. 1) can count a number of proposals of people (shown as rectangles), whose feet are located within the line area previously defined (three in the example shown). FIG. 4A includes a register clerk proposal, which is shorter and does not include information for the lower portion due to the counter. In FIG. 4B, computer system 20 may determine that two or more proposals (e.g., the rightmost two proposals) are part of a group, and therefore counted as only a single customer. In FIG. 4C, computer system 20 can determine that the uppermost proposal is an employee based on the location over time. Further, computer system 20 could generate a warning when the proposal first enters the area in case the individual is not an employee. In FIG. 4D, computer system 20 can determine that the rightmost proposal is merely exiting the store and is not waiting in line. Computer system 20 can determine the length for each hypothesis 42 in the set of hypotheses, using only the most probable hypothesis, using a subset of probable hypotheses, and/or the like. When multiple hypotheses are used, computer system 20 can combine the lengths using a weighted average based on their corresponding scores/probabilities.

Figure 5:
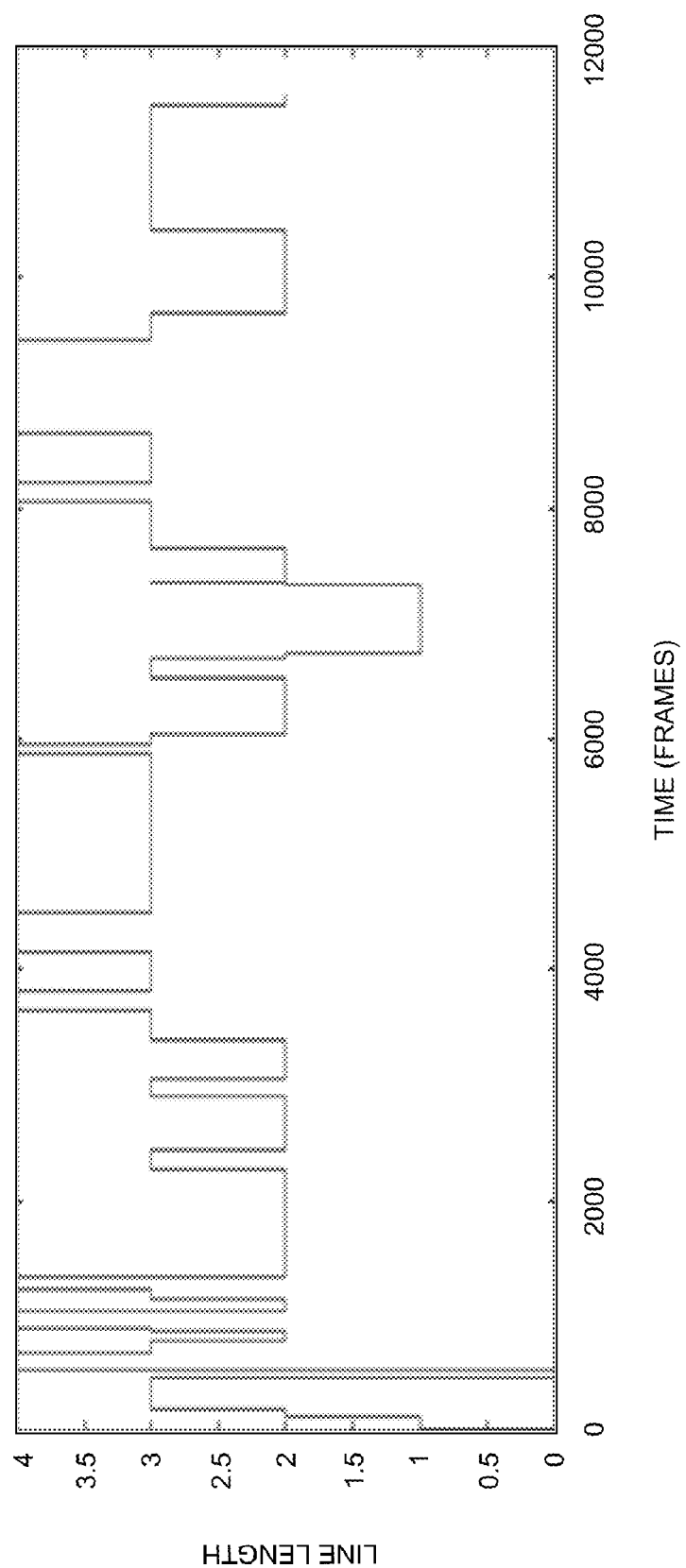
FIG. 5 shows an illustrative graph of a line length for a line location according to an embodiment.

In process M7, computer system 20 can process the estimated line length. For example, computer system 20 can store the line length as line data 40. Further, computer system 20 can present the line length/a history of the line length(s) for a set of lines using any solution. For example, FIG. 5 shows an illustrative graph of a line length for a line location according to an embodiment, which can be generated by computer system 20. Further, the results may be presented as a current count, e.g., as a meter (rotating pointer), bar graph, and/or the like. The results can be presented for individual lines, or aggregated across multiple lines, potentially even multiple stores. A graph of such counts over time may be presented and correlations of the count history made with day of the week/year, time, promotions, weather, staff identities, transactions carried out, store layout, and/or the like. Still further, computer system 20 can present results in an ambient manner (e.g., brightness of a lamp in a store loss prevention office, volume/pitch of a sound played in an office, and/or the like) as shown and described in U.S. patent application Ser. No. 11/622,132, which was filed on 11 Jan. 2007, titled "Ambient presentation of surveillance data", which is incorporated herein by reference.

Additionally, computer system 20 can determine whether one or more actions 44 are required based on the line length. To this extent, computer system can trigger an alert based on an instantaneous value (e.g., line is too long). The alert can be presented to user 12 using any solution, such as a visual alert (e.g., an email, text message, pop-up notification, a flashing icon in a central office report page, and/or the like), an audible alert (e.g., message over a two-way radio, mobile phone, PDA, and/or the like), and/or the like.

Further, computer system 20 can trigger actions/alerts based on long-term patterns of the line length (e.g., average line length when cashier X is working exceeds average by two standard deviations). Still further, user 12 and/or computer system 20 can perform various types of data mining on the line lengths (and/or other extracted measurements). For example, in a retail environment, a length of a supermarket checkout line can be a good predictor of one aspect of customer satisfaction, and can be used as a performance measure for a store, cashier, store layout etc. The length of the line also can be used to guide store policy and staffing. For instance, a store may institute a policy of "no more than one person in line" and call up staff from other duties to staff registers if the lines grow longer than this. In the longer term, staff schedules can be planned to reduce the likelihood of long lines, particularly in conjunction with techniques to predict customer numbers.

In any event, flow can return to process M2, wherein the camera 14 is adjusted for another line location. In this manner, a single camera can be utilized to cover multiple line locations and the corresponding lines. Further, the hypothesis (es) for each line location can be continually generated and adjusted in an iterative manner. Still further, it is understood that camera 14 and/or computer system 20 can implement additional security/monitoring functions, such as verification of scanning actions, till actions, customer/employee location detection, and/or the like.

It is understood that each of the process flows shown and described herein is only illustrative. To this extent, numerous variations of these process flows are possible, and are included within the scope of the invention. Illustrative variations include performing one or more processes in parallel and/or a different order, performing additional processes, not performing some processes, and/or the like. To this extent, computer system 20 and/or monitoring program 30 can utilize multiple tasks/threads/processes to perform the actions of the processes described herein.

While shown and described herein as a method and system for monitoring an area, it is understood that aspects of the invention further provide various alternative embodiments. For example, in one embodiment, the invention provides a computer program stored on at least one computer-readable medium, which when executed, enables a computer system to monitor an area. To this extent, the computer-readable medium includes program code, such as monitoring program 30 (FIG. 1), which implements some or all of the process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; a modulated data signal having one or more of its characteristics set and/or changed in such a manner as to encode information in the signal; paper; and/or the like.

In another embodiment, the invention provides a method of generating a system for estimating a length of a line. In this case, a computer system, such as computer system 20 (FIG. 1), can be obtained (e.g., created, maintained, made available, etc.) and one or more programs/systems for performing the process described herein can be obtained (e.g., created, purchased, used, modified, etc.) and deployed to the computer system. To this extent, the deployment can comprise one or more of: (1) installing program code on a computing device from a computer-readable medium; (2) adding one or more computing devices to the computer system; and (3) incorporating and/or modifying the computer system to enable it to perform the process described herein.

It is understood that aspects of the invention can be implemented as part of a business method that performs the process described herein on a subscription, advertising, and/or fee basis. That is, a service provider could offer to estimate a length of a line as described herein. In this case, the service provider can manage (e.g., create, maintain, support, etc.) some or all of environment 10 (FIG. 1), such as computer system 20 (FIG. 1), that performs the process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of monitoring an area, the method comprising:
obtaining at least one image of a physical area corresponding to a line;
evaluating a set of hypotheses based on the at least one image;
extracting an estimated length from at least one of the set of hypotheses;
generating an estimated line length based on the extracted estimated lengths and the evaluating; and
storing the estimated line length.

2. The method of claim 1, further comprising capturing each of the at least one image with a single camera, the single camera located above and at an angle with respect to the physical area.

3. The method of claim 2, further comprising adjusting the single camera to capture an image of a second physical area corresponding to a second line, distinct from the first line.

4. The method of claim 1, wherein a hypothesis in the set of hypotheses includes a set of proposals, each proposal in the set of proposals comprising a model of an object and a corresponding location of the object in the at least one image.

5. The method of claim 4, wherein the hypothesis includes a plurality of proposals, and wherein at least one of the plurality of proposals includes relationship data between the at least one of the plurality of proposals and another one of the plurality of proposals.

6. The method of claim 4, further comprising adjusting the set of proposals in the hypothesis using a Markov Chain Monte Carlo framework.

7. The method of claim 1, further comprising generating a hypothesis in the set of hypotheses by adjusting a previous hypothesis based on the at least one image.

8. The method of claim 1, the evaluating including:
projecting a hypothesis in the set of hypotheses into the at least one image;
comparing a set of visual characteristics for the hypothesis with a set of visual characteristics for each of the at least one image; and
calculating a match score based on the comparing.

9. The method of claim 1, wherein the generating includes:
selecting a subset of the set of hypotheses having the highest match scores; and
generating the estimated line length from the estimated length of each hypotheses in the subset.

10. The method of claim 1, further comprising obtaining non-image data corresponding to the line, wherein the evaluating is further based on the non-image data.

11. The method of claim 1, further comprising processing the estimated line length.

12. A system comprising:
a computer system, including at least one computing device, for monitoring an area by performing a method comprising:
obtaining at least one image of a physical area corresponding to a line;
evaluating a set of hypotheses based on the at least one image;
extracting an estimated length from at least one of the set of hypotheses;
generating an estimated line length based on the extracted estimated lengths and the evaluating; and
storing the estimated line length.

13. The system of claim 12, further comprising a camera for capturing each of the at least one image, the camera located above and at an angle with respect to the physical area.

14. The system of claim 13, the method further comprising a adjusting the camera to capture an image of a second physical area corresponding to a second line, distinct from the first line.

15. The system of claim 12, wherein a hypothesis in the set of hypotheses includes a set of proposals, each proposal in the set of proposals comprising a model of an object and a corresponding location of the object in the at least one image.

16. The system of claim 15, wherein the hypothesis includes a plurality of proposals, and wherein at least one of the plurality of proposals includes relationship data between the at least one of the plurality of proposals and another one of the plurality of proposals.

17. The system of claim 15, the method further comprising a adjusting the set of proposals in the hypothesis using a Markov Chain Monte Carlo framework.

18. The system of claim 12, the method further comprising a generating a hypothesis in the set of hypotheses by adjusting a previous hypothesis based on the at least one image.

19. The system of claim 12, the method further comprising a obtaining non-image data corresponding to the line, wherein the evaluating is further based on the non-image data.

20. A computer program comprising program code stored on a computer-readable device, which when executed, enables a computer system to implement a method for monitoring an area, the method including:
obtaining at least one image of a physical area corresponding to a line;
evaluating a set of hypotheses based on the at least one image;
extracting an estimated length from at least one of the set of hypotheses;
generating an estimated line length based on the extracted estimated lengths and the evaluating; and
storing the estimated line length.

21. The computer program of claim 20, wherein a hypothesis in the set of hypotheses includes a set of proposals, each proposal in the set of proposals comprising a model of an object and a corresponding location of the object in the at least one image.

22. The computer program of claim 21, wherein the hypothesis includes a plurality of proposals, and wherein at least one of the plurality of proposals includes relationship data between the at least one of the plurality of proposals and another one of the plurality of proposals.

23. The computer program of claim 21, the method further comprising adjusting the set of proposals in the hypothesis using a Markov Chain Monte Carlo framework.

24. The computer program of claim 20, the method further comprising obtaining non-image data corresponding to the line, wherein the evaluating is further based on the non-image data.

25. A method of generating a system for monitoring an area, the method comprising:
providing a computer system for monitoring the area by performing a method comprising:
obtaining at least one image of a physical area corresponding to a line;
evaluating a set of hypotheses based on the at least one image;
extracting an estimated length from at least one of the set of hypotheses;
generating an estimated line length based on the extracted estimated lengths and the evaluating; and
storing the estimated line length.

* * * * *